Aug. 31, 1965
J. SCHAEDLER
3,203,549
LIQUID FILTERING APPARATUS
Filed March 14, 1962
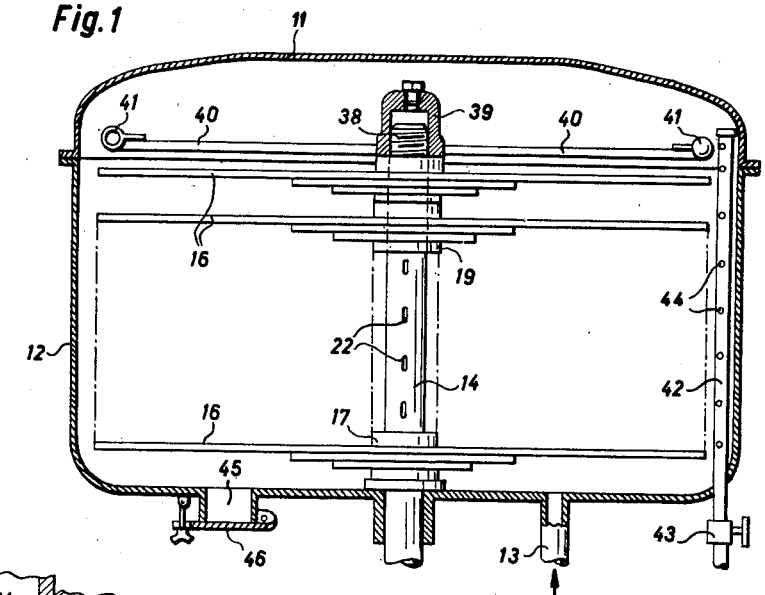
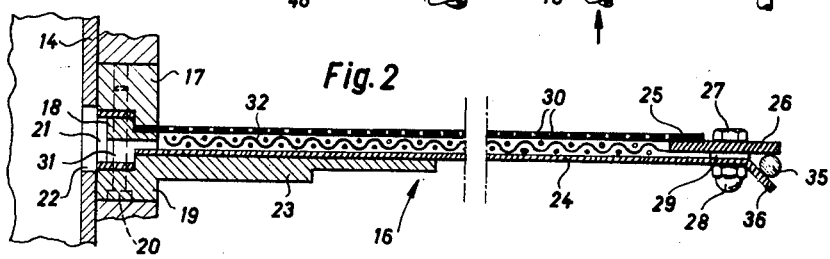
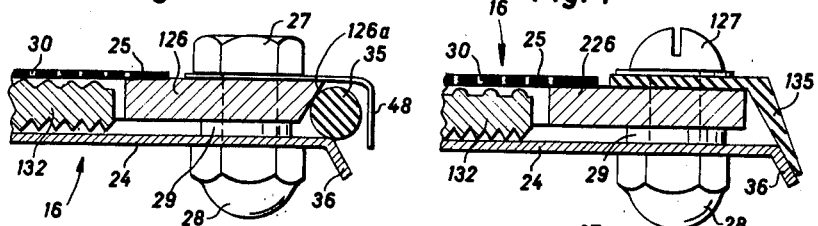
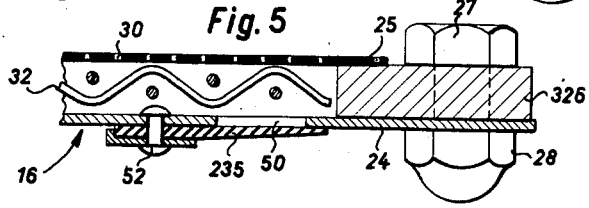
Inventor
Josef Schaedler
By
Watson, Cole, Grindle & Watson
Attys.

United States Patent Office 3,203,549
Patented Aug. 31, 1965

3,203,549
LIQUID FILTERING APPARATUS
Josef Schaedler, St. Gallen, Switzerland, assignor to Filtrox-Werk AG., St. Gallen, Switzerland
Filed Mar. 14, 1962, Ser. No. 179,653
Claims priority, application Switzerland, Mar. 17, 1961, 3,274/61
5 Claims. (Cl. 210—136)

This invention relates to a liquid filtering apparatus comprising a casing for receiving the liquid to be filtered and at least one filter element which is designed as a disk-shaped hollow body with sieve openings on at least one of its flat sides, and arranged on a coaxial tubular carrier which protrudes through the filter element and has at least one radial opening communicating with the interior of the filter element to discharge the filtrate.

Filtering apparatuses of the type are known and especially used in the beverage industry. To the liquid to be filtered, a granular neutral filtering medium, such as kieselguhr, is added which forms, on the outside of the filter element provided with the sieve openings, a filter cake in which the substances causing turbidity of the liquid are retained. Cleaning of the filter elements of such apparatuses may take place in two ways without the apparatus needing to be dismantled. Either a cleaning liquid is pressed through the apparatus in the opposite direction, to thereby obtain a return rinsing, or the tubular carrier with the filter elements arranged thereon is set in rotation, so that the filtration residues are thrown off by centrifugal action. These two ways of cleaning may also be applied at the same time.

Now it has been found that, especially at the beginning of each filtration, when the filter cake is only starting to form, some dirt particles may enter the interior of the filter elements through the sieve openings and remain therein. Neither by the aforesaid return rinsing, nor by making the filter elements rotate, can the turbidity-causing substances that have penetrated the interior of the filter elements be totally removed. By the centrifugal action caused by rotation, the entrapped turbidity-causing substances are pressed onto the peripheral edge of the interior of the filter elements to eventually form there a compact ring of such substances.

The object of the invention is to obviate the aforementioned shortcomings. This aim is achieved by the filtering apparatus according to the invention, which is characterized in that the filter element, besides the sieve openings, has at least one additional rather large opening with an associated closing member which is movable by the liquid pressure, automatically closes during the filtering operation because of the higher pressure prevailing outside the filter element, and can be opened for cleaning the filter element.

Further features of the invention will appear from the following description and claims, taken in conjunction with the accompanying drawing, wherein there are shown, purely by way of example, some forms of embodiment incorporating the invention.

In said drawing:

FIG. 1 shows diagrammatically, partly in vertical section and partly in side view, a filtering apparatus of the type under review;

FIG. 2 shows, partly on a larger scale and in vertical axial section, part of a tubular carrier and of a single filter element of the apparatus according to a first form;

FIG. 3 shows on a larger scale a detail of a second form of a single filter element;

FIG. 4 represents a third form similar to FIG. 3; and

FIG. 5 shows a fourth form similar to FIG. 3.

Referring to FIG. 1, which holds in all forms shown, the filtering apparatus comprises a casing 12 with a removable cover 11, into which casing the liquid to be filtered can be forced under pressure by means of a piping 13. The means adapted to detach and fasten the cover 11 fluid-tight on casing 12 are assumed to be known and therefore not illustrated. The bottom of casing 12 has rotatably supported thereon a vertically extending tubular carrier 14 which reaches up to the level of cover 11 and serves for discharging the filtrate. On carrier 14, several disk-shaped filter elements 16 are coaxially arranged in superposed relation, not all of which are shown in FIG. 1. All elements 16 are similar to each other and have two openings coaxially opposite each other, through which the carrier 14 passes coaxially.

In FIG. 2, the design of a single element 16 is shown in greater detail. The carrier 14 is surrounded by a hub comprising three annular parts 17, 18, 19. All three hub parts 17, 18, 19 are coaxially alined with respect to each other and interconnected by several screws 20, only one of which is indicated in broken lines in FIG. 2. Whereas the two outer hub parts 17 and 19 lie snugly on the outside of carrier 14, the middle hub part 18 is of a larger internal diameter so as to form at the hub a peripheral groove 21 open inwards i.e. towards carrier 14, into which groove at least one radial opening 22 opens in the wall of carrier 14.

The lower hub part 19 is provided with a substantially dished portion 23 adapted to support a circular plate 24. The latter has a central aperture whose circumferential edge is clamped between the lower hub part 19 and the middle hub part 18. A second plate 25, extending at a distance over plate 24, has likewise a central aperture whose circumferential edge is clamped between the middle hub part 18 and the upper hub part 17. Both plates 24 and 25 are connected to the hub 17,18,19 fluid-tight. The outer circumferential edge of the upper plate 25 is connected to an annular stiffening ledge 26, as by riveting, welding or soldering. By means of several screws or bolts 27, only one of which is visible in FIG. 2, with pertinent cap nuts 28, said ledge is mounted on the lower plate 24, whereby each of said screws 27 is passed through a washer 29 interposed between ledge 26 and lower plate 24. For this reason the filter element has at its periphery slot-like circumferentially running openings. Furthermore, the upper plate 25 is provided with a large number of fine sieve openings 30.

From the foregoing description it appears that each element 16 is a disk-shaped hollow body. The interior of the element communicates with the circumferential groove 21 through at least one radial groove 31 in the middle hub part 18 and contains a supporting body 32 permeable to liquid, which in the present case consists of a wide-meshed wire netting.

Between the stiffening ledge 26 and the lower plate 24, the slot-like openings extending along the periphery of element 16 have allocated thereto a closing member 35 which is a rubber-elastic endless cord of round cross-section. Under the influence of its own elasticity, the closing member 35 rests with slight pressure substantially radially from outside on the outwardly directed face of a conical edge 36 at the lower-plate 24 and on the lower side of ledge 26, i.e. on two seatings arranged V-shaped to each other, with the slot-like openings arranged therebetween. The closing member 35 may preferably consist of a hollow rubber tube and a helical spring inserted therein, both of them endless.

At the top the carrier member 14 is provided with a threaded portion 38 having a cap nut 39 detachably screwed on, by means of which all elements 16 are clamped on the carrier member 14. The cap nut 39 has a plurality of arms 40 projecting radially outwards, each carrying at its outer end a turbine-wheel blade 41. Inside the casing 12 is a vertically extending piping 42 which, through a cock 43, communicates with a source of pressure water. The piping 42 is closed at the top and has a row of nozzle apertures 44. The topmost nozzle aperture is aranged tangentially to the ring of blades 41, whereas the other nozzle apertures are obliquely directed towards the upper side of filter elements 16. Provided in the bottom of casing 12 is a dirt discharge opening 45 which is closed by a detachable cover 46.

The action of the described filtering apparatus is as follows:

A liquid to be filtered, having also mixed therewith a filtering medium in the form of, say, granulated kieselguhr, is forced through the piping 13 into casing 12, while covers 11 and 46 and cock 43 are closed. By reason of the higher pressure prevailing outside the filter elements, the closing member 35 of each filter element is pressed firmly onto its allocated seating so as to ensure a fluid-tight closure. For lack of another discharge way, the liquid penetrates the free interior of the filter elements 16 through the fine sieve openings 30 in the upper plate 25, to then enter the hollow space of carrier 14 through the grooves 31, 21 and openings 22, whence the filtrate is led away to the required place. Coarse impurities in the liquid and the granules of the filtering medium cannot pass through the sieve openings 30 and are thus retained on the upper side of plate 25 of each element 16, so that a filter cake settles there, which then forms the actual filter and is even capable of holding back also comporatively small foreign matter in the liquid being filtered. Only at the beginning of the filtering operation some small substances causing turbidity enter through the sieve openings 30 the interior of the filter elements, where said substances are partly suspended.

When after a protracted period of service time the apparatus becomes clogged, the filter elements 16 must be cleaned. For this purpose, admission of liquid through piping 13 is stopped, the cover 46 of the slurry discharge 45 is opened, whereupon pressure water is admitted into piping 42 by opening the cock 43. Then from the nozzles 44 of piping 42 jets of water emerge which, by means of the blades 41, set the carrier member 14 together with the elements 16 into rapid rotation, and at the same time spray the filter cakes deposited thereon. By this means the filter cakes are comparatively rapidly detached from the filter elements 16, the deposited material being thrown outwards by centrifugal action of the rotating elements 16 and washed out by the cleaning water through the opening 45. Because of the centrifugal action, the closing member 35 is raised to a slight extent from its seatings at the circumference of each element 16, so that the substances causing turbidity that have penetrated the interior of the filter elements can be thrown out through the slot-like openings between ledge 26 and lower plate 24. Such throwing-out of said substances is supported by the water which enters the interior of the filter elements through the sieve openings, when cleaning, and which is also thrown out. Because of the centrifugal action, in the peripheral zone of the interior of the filter elements a higher pressure prevails than outside thereof. Thus pressure difference would likewise be sufficient to raise the closing member 35 of each filter element from its seating and thus open the slot-like openings at the outermost circumference of the elements.

The form shown in FIG. 3 differs from that described in that, interiorly of the filter element shown, instead of a wire netting 32, there is provided an insert plate 132 which presents ridges both at its upper and lower side, which ridges serve as supports for the plates 24 and 25. The insert plate 132 may consist of, say, rubber or the like. Another difference lies in the arrangement of the endless closing member 35 which, according to FIG. 3, under the influence of its own elasticity and of the higher pressure prevailing outside the filter elements when filtering, rests on a conical seating 126a of the stiffening rim 126 and on the upper side of the lower plate 24. In order, when cleaning the apparatus—which takes place in the aforedescribed way—that the closing member 35 can by no means entirely move clear of the respective element, several angle pieces 48 are mounted by screws 27 on the periphery of the filter element, which angles engage over the member 35 outside at some distance away. It is understood that such angles may also be provided in the form according to FIG. 2.

FIG. 4 illustrates a form in which, instead of an endless cord 35, there is provided another closing member 135 with a movable lip which, from outside, loosely rests on the conical rim 36 of the lower plate 34. The closing member 135, that consists of rubber or the like, is held on the ledge 226 by screws 127. During the filtering operation the higher liquid pressure prevailing outside the filter elements presses the lip of member 135 fluid-tight onto rim 36, whereas, when cleaning the apparatus, the rubber-like lip of member 135 is rated from rim 36 due to centrifugal action and the higher pressure prevailing in the interior of the filter elements, so that the turbidity-causing substances having penetrated the elements, can be thrown out.

In the form according to FIG. 5, the peripheral portion of the lower plate 24 is pressed, by means of screws 27 and cap nuts 28, direct onto the lower side of the ledge 326. On the radial inner side of ledge 326, the lower plate 24 has a plurality of openings 50 distributed circumferentially and having allocated thereto a rubber-elastic closing member 235. The latter has the form of an annular disk whose inner circumferential rim is attached to plate 24 by means of rivets 52 or the like. The outer circumference of said disk 235 forms a lip which covers the openings 50 and rests from below on plate 24. In the filtering operation, the annular disk 235 is pressed closed in front of the openings 50 so as to block them. On the other hand, when cleaning the apparatus, the outer peripherial portion of disk 235 can bend itself away from plate 24 under the influence of the higher liquid pressure then prevailing in the interior of the filter elements, and thus free the openings 50.

In the described forms, cleaning of the apparatus has been assumed to take place by rotation and by spraying of the filter elements. But with the same designs of elements, it is equally possible to perform the cleaning by return rinsing, by admitting pressure water through the tubular carrier 14, whereby again dirt particles and the rinsing water are discharged through the opening 45. Also, if desired, both types of cleaning may be combined.

The apparatus according to the invention is not confined to horizontal filter elements arranged on a vertical carrier. The disk-shaped filter elements may equally well be arranged on a horizontal carrier.

In an embodiment of the apparatus as modified with respect to FIG. 1, separate piping 42 may be provided with at least one nozzle for driving the turbine wheel 39, 40, 41 and/or with nozzles 44 for rinsing the filter elements 16.

What I claim is:

1. Liquid filtering apparatus comprising a casing for receiving the liquid to be filtered, at least one flat-sided filter element in the form of a disk-shaped hollow body with sieve openings on at least one of its flat sides mounted in the casing, a coaxial tubular carrier in the casing which protrudes through said element and has at least one radial opening communicating with the interior of the element to discharge a filtrate into said tubular carrier, means to rotate said carrier and body, said element having in addition to said sieve openings, at least one additional larger opening, said larger opening including a closing means responsive to liquid pressure obtaining in said casing and capable, when filtering, of closing automatically due to the higher pressure prevailing outside said element and opening due to rotation when cleaning the same, said additional opening extending slot-like along the peripheral circumference of the filter element.

2. Liquid filtering apparatus according to claim 1, in which V-shaped seatings are provided with the slot-like opening extending therebetween, and wherein the closing means is a rubber-elastic ring.

3. Liquid filtering apparatus according to claim 1, in which V-shaped seatings are provided with the slot-like opening extending therebetween, and wherein the closing means is a rubber-elastic ring which upon rotation of the carrier and the body centrifuges out therefrom any impurities from the interior of the filter element.

4. Liquid filtering apparatus according to claim 1, including a seating means extending adjacent said slot-like opening, and wherein the closing means is in the form of a rubber-elastic ring-shaped lip which, from outside the filter element, rests on said seating means.

5. Liquid filtering apparatus according to claim 1, in which a seating means is provided adjacent the slot-like opening for the closing means.

References Cited by the Examiner

UNITED STATES PATENTS

| 792,042 | 6/05 | Howell | 233—24 |
| 1,751,982 | 3/30 | Dunham | 233—20 |
| 1,811,157 | 6/31 | Schwerdtfeger | 233—24 |
| 2,082,690 | 6/37 | Dorer | 233—24 |
| 2,477,982 | 8/49 | Hintz | 233—46 X |
| 2,635,617 | 4/53 | Condell | 233—46 X |
| 2,703,177 | 3/55 | Kunstorff | 210—331 |
| 2,737,300 | 3/56 | Kracklauer | 210—347 |
| 2,749,031 | 6/56 | Hornbostel | 233—20 |
| 3,004,050 | 10/61 | Ayres | 233—21 X |

FOREIGN PATENTS 357,056  11/61  Switzerland.

REUBEN FRIEDMAN, *Primary Examiner.*
ROBERT F. BURNETT, *Examiner.*